United States Patent [19]
Ferraiolo et al.

[11] Patent Number: 5,185,768
[45] Date of Patent: Feb. 9, 1993

[54] DIGITAL INTEGRATING CLOCK EXTRACTOR

[75] Inventors: Frank D. Ferraiolo, New Windsor, N.Y.; John E. Gersbach; Ilya I. Novof, both of Burlington, Vt.

[73] Assignee: International Business Machines Corporation, Armonk, N.Y.

[21] Appl. No.: 594,242

[22] Filed: Oct. 9, 1990

[51] Int. Cl.$^5$ .............................................. H03D 3/24
[52] U.S. Cl. ..................................... 375/119; 328/72; 307/510
[58] Field of Search ............... 375/119, 118, 106, 108; 328/72, 63, 74, 155; 370/100.1, 105.3, 108; 307/510, 511

[56] References Cited

U.S. PATENT DOCUMENTS

| | | | |
|---|---|---|---|
| 3,504,340 | 3/1970 | Allen | 340/146.1 |
| 3,986,126 | 10/1976 | Gindi et al. | 328/63 |
| 4,305,045 | 12/1981 | Metz et al. | 331/1 A |
| 4,584,695 | 4/1986 | Wong et al. | 375/81 |
| 4,653,074 | 3/1987 | Griffin et al. | 375/106 |
| 4,658,217 | 4/1987 | Takatori et al. | 328/139 |
| 4,677,648 | 6/1987 | Zurfluh | 375/120 |
| 4,811,282 | 3/1989 | Masina | 364/900 |
| 4,841,551 | 6/1989 | Avaneas | 375/118 |
| 4,908,842 | 3/1990 | Collins | 375/119 |
| 4,959,846 | 9/1990 | Apple et al. | 375/118 |
| 4,972,444 | 11/1990 | Melrose et al. | 375/119 X |
| 5,022,056 | 6/1991 | Henderson et al. | 375/119 |
| 5,022,057 | 6/1991 | Nishi et al. | 375/119 |
| 5,034,967 | 7/1991 | Cox et al. | 375/119 |
| 5,036,528 | 7/1991 | Costantino et al. | 375/119 |
| 5,046,075 | 9/1991 | Kraemer et al. | 375/119 |
| 5,095,498 | 3/1992 | DeLuca et al. | 375/111 |

OTHER PUBLICATIONS

Lindsey, et al., "A Survey of Digital Phase-Locked Loops, Proceedings of the IEEE", vol. 69, No. 4, pp. 410-431, 1981.
Rein, Hans-Martin, "Multi-Gigabit-Per-Second Silicon Bipolar IC's for Future Optical-Fiber Transmission Systems", IEEE Jor. of Solid State Circuits, vol. 23, No. 3, pp. 664-675, 1988.

Primary Examiner—Stephen Chin
Attorney, Agent, or Firm—Heslin & Rothenberg

[57] ABSTRACT

A digital integrating clock extraction technique for communication systems and information and data processing systems having high jitter and/or noise is disclosed. The technique is based on the integration and periodic analysis of a plurality of sorted data edge transitions of a received serial data stream. A retiming clock phase is selected from a plurality of locally generated clock signals of different phase. The retiming clock selection is preferably reevaluated after N data edge transition sorts. The resultant data edge histogram can be cumulative of all sorted transitions or merely cumulative of the last N sorted transitions. Corresponding methods and apparatus are described.

22 Claims, 4 Drawing Sheets

DIGITAL INTEGRATING CLOCK EXTRACTOR

BACKGROUND OF THE INVENTION

1. Technical Field

This invention relates in general to communication systems and information and data processing systems, and more particularly, to digital phase locked logic circuits for extracting a retiming signal from a received serial data stream.

2. Description of the Prior Art

Phase locked loops (PLLs) are a critical component in many data communication networks. PLLs are used for locally maintaining in remote stations a clock signal that corresponds in frequency and phase to the clock of data signals transmitted through the network and received by the station. The difference between a VCO generated signal and the clock signal recovered from the received data is monitored and the phase and frequency of the VCO signal is adapted and "locked" to that of the received data signal.

Progress in increasing performance, speed, reliability, and the simultaneous reduction in size and cost of integrated circuits (LSI and VLSI) continues to create strong interest in the implementation of PLLs in the digital domain. Aside from the obvious advantages associated with digital systems, a digital version of the PLL (DPLL) alleviates some of the problems associated with its analog counterpart; namely, sensitivity to noise and parameter variations, difficulties encountered in building higher order loops, and, depending on the system, the need for initial calibration and periodic adjustments. Various digital phase locked logic circuits are described in the literature. An early survey is given in an article by W. C. Lindsey et al., entitled "Survey of Digital Phase Locked Loops", Proceedings of the IEEE, Vol. 69, No. 4, April 1981, pp. 410–431.

Data jitter (a valid transition occurring other than where expected) and noise (an invalid transition) can be major problems in high speed data communication links. One approach to addressing these problems with DPLL circuit design is described by E. A. Zurfluh in U.S. Pat. No. 4,677,648, entitled "Digital Phase Locked Loop Synchronizer," assigned to the same assignee as the present invention. According to the patent, a local oscillator clock signal of a given frequency is furnished to an analog delay chain which is used in a dual function, i.e., for determining the phase offset between a data signal and a locally generated clock signal, and for obtaining a phase shifted signal. Evaluation means, upon occurrence of a data signal transition, obtains bi-level tap signal values as a phase offset indication and generates an appropriate phase selection signal which selects one of the delay line tap signals as the output clock signal. The evaluation means, which instantaneously corrects the output clock signal on every data edge transition, typically includes an encoder and a look-up table. Although somewhat successful under jitter conditions, the Zurfluh technique experiences difficulty in differentiating between noise and valid data transitions, especially in a high jitter environment.

The DPLL clock extractor described herein, therefore, is designed to address and expand upon the performance limitations of existing digital data retiming circuit technology, and in particular, to allow for higher accuracy in data retiming under high jitter and/or high noise conditions.

SUMMARY OF THE INVENTION

Briefly described, this invention comprises in one aspect a method for selecting a retiming signal for a received serial data stream from a plurality of local clock signals of different phase. The method includes the steps of: sorting in time M data edge transitions of the serial stream; and selecting a retiming signal from the plurality of local clock signals which coincides in time with a minimum number of the M sorted data edge transitions. In an enhanced version, subsequent selection of the initial retiming signal the method includes: sorting in time N additional data edge transitions of the serial stream; and selecting a new retiming signal from the plurality of local clock signals such that the new retiming signal coincides in time with a minimum number of the N (or M+N) sorted data edge transitions. Additional method features are also described and claimed herein.

In another aspect, the invention comprises apparatus for selecting a retiming signal for a serial data stream. A data edge sorting circuit, which is coupled to receive the serial data stream, operates to phase sort a plurality of data edge transitions of the serial stream. Generating means is provided for producing a plurality of local clock signals of different phase from which a retiming signal is selected. Integrating means is coupled to the data edge sorting circuit to receive the sorted data edge transitions and comparison means is coupled to the integrating means for identifying a proper retiming clock phase from the plurality of generated local clock signals by comparison thereof with the integrated data edge transitions. In one embodiment, the comparison means comprises clock selection logic, the integration means includes time slot counters, and the relative time slot counter values are output to the clock selection logic for identification of a compatible retiming clock phase.

The present inventive technique, whether method or apparatus, features the creation of a histogram of a preselected number of data edge transitions and use thereof to select an appropriate data retiming signal from a plurality of locally available DPLL clock signals. The histogram is re-examined after every N data edge sorts and a new data edge retiming signal is chosen based thereon. The integrated approach described herein allows accurate data retiming even of highly jittered and/or noisy data streams. The technique is suitable for high speed applications and can be realized in hardware or in hardware/software combinations.

BRIEF DESCRIPTION OF THE DRAWINGS

These and other objects, advantages and features of the present invention will be more readily understood from the following detailed description of certain preferred embodiments of the present invention, when considered in conjunction with the accompanying drawings in which.

DETAILED DESCRIPTION OF THE INVENTION

As noted, the present invention comprises a control technique for selecting an appropriate clock signal, from a plurality of locally generated clock signals of different phase, for use in retiming of a serial data stream. The technique is based on the integration and periodic analysis of a plurality of sorted data edge transitions. A retiming clock selection is preferably re-evaluated after every N data edge transition sorts. The resultant data edge histogram can be cumulative of all sorted transitions or merely cumulative of the last N sorted transitions.

Figure 1:
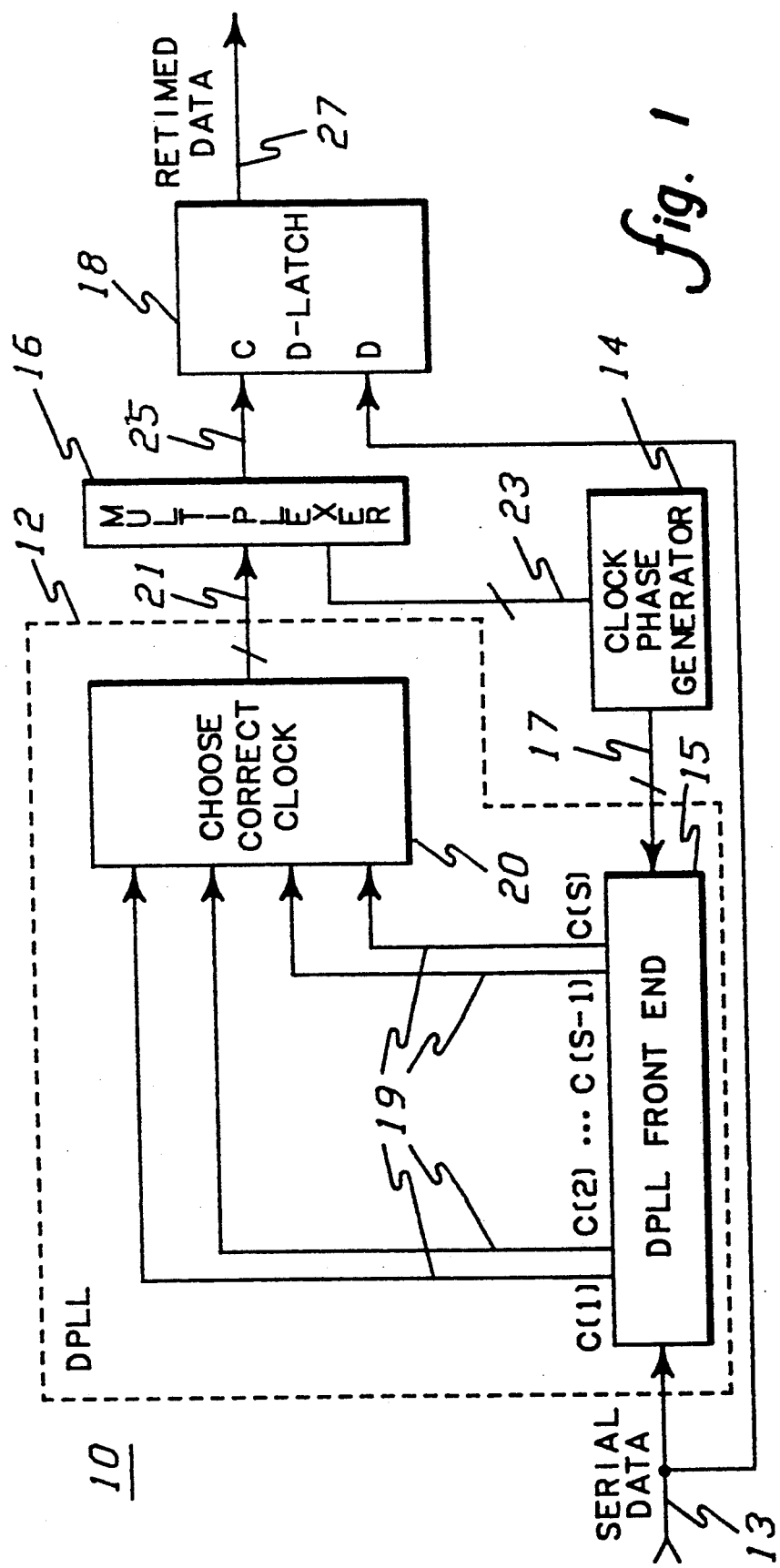
FIG. 1 is a block diagram representation of a DPLL data retiming circuit pursuant to the present invention.

A generalized embodiment of a data retiming circuit, denoted 10, is depicted in FIG. 1. Retiming circuit 10 includes a digital phase locked logic circuit (DPLL) 12, a clock phase generator 14, a multiplexer 16 and an edge triggered D-latch 18. As noted above, DPLLs are now well known in the art and will therefore not be described in detail herein. In operation, a serial stream of clock and data signals to be retimed, and subsequently deserialized, is received on line 13 which is coupled to an input of a DPLL front end circuit 15. DPLL front end circuit 15 results from a somewhat arbitrary division of DPLL 12. Circuit 15 receives from generator 14 on lines 17 a plurality of clock signals of different phase. Generator 14 and circuit 15 components may include, for example, a local clock generator, a clock delay line and data edge sorting circuitry. Such components are described in the referenced U.S. Pat. No. 4,677,648, the entirely of which is hereby incorporated herein by reference.

DPLL front end circuit 15, through its data edge sorting circuitry (see FIG. 2), outputs a plurality of pulse signals C(1), C(2) ... C(S−1) & C(S) on an equivalent number of lines 19, which are coupled to a choose correct clock circuit 20. Circuits 15 & 20 essentially comprise digital phase lock logic circuit 12, shown in phantom in FIG. 1. The S outputs C(1), C(2) ... C(S−1) & C(S) from circuit 15 represent discrete time intervals relative to the DPLL local clock. The leading edge of one time interval occurs precisely at the trailing edge of the previous interval. A pulse signal for each data edge transition of the serial stream is provided on a corresponding one of the S outputs to signify the location in time of the transition relative to the DPLL local clock.

Choose correct clock circuit 20 operates to select a proper local clock phase for use in data retiming from a plurality of local clocks of identical frequency but different phase. The present invention is specifically directed to this DPLL function. Again, pursuant to the invention, clock selection is made based upon an analysis of the historical distribution of a predefined number of sorted data edge transitions. An identification of a selected clock signal is output from DPLL 12 on line 21 to a multiplexer 16 which also receives as input (on line 23) a plurality of local clock signals of different phase produced by clock phase generator 14. The output (on line 25) of multiplexer 16 is fed to the clock input "C" of edge triggered data latch 18. A second, data input "D" to latch 18 is coupled to line 13 for receiving the serial data stream. Data is latched on either the rising or falling clock edge. Retimed data is output from latch 18 on line 27, for example, to a deserialization circuit (not shown).

The invention, and in particular choose correct clock circuit 20, will now be described in greater detail with reference to the block diagram of FIG. 2.

As noted, a data edge sorting circuit 30 in DPLL front end circuit 15 provides circuit 20 with an instantaneous indication of the approximate location in time of a data edge transition relative to the DPLL local clock produced by generator 14. Successive location indications are transmitted from circuit 30 via S lines 19 to a corresponding number of time slot counters 32 located in circuit 20. In practice, the local reference clock produced by generator 14 and used by DPLL circuit 12 is configured to cover one period or more of the input data clock. This guarantees that each data edge transition will be detected and sorted into one of the S time intervals or slots. Also, as described further below, because the local clock period is slightly greater than the input period, two time slot counter will initially (and thereafter periodically) accumulate counts at a faster rate than the remaining counters, even under a high jitter or high noise condition. This information can be beneficially used to select an appropriate clock signal phase.

Counters 32 thus integrate (accumulate a historical overview of) the locations of successive sorted data edge transitions. The present technique employs this histogram to initially select and then re-select a proper retiming clock phase. A preferred retiming signal will occur at a flat or null in the histogram, i.e., at a time interval containing a relative "minimum number" (herein defined to be zero or a nonzero minimum number) of sorted data edge transition representations. Also, since in practice the local clock frequency may be slightly different from the input frequency, data edge sorting circuit 30 may signal a constantly changing timing of data edge transitions relative to the local clock. The data edge transition locations will slowly roll through the time slot counters, which produces a slowly shifting histogram. (As noted, lines 19 are mutually exclusive in that only one is active in any given data cycle. The active line indicates the location in time of a present data edge transition relative to the local DPLL clock.)

Counters block 32 also includes a total counter which outputs a signal on line 35 to a clock selection logic 38. The total counter functions to provide logic 38 with an indication of when a prechosen number (M or N, discussed below) of data transitions have occurred, i.e., have been counted by the time slot counters. The outputs 33 of the time slot counters are coupled to logic 38 and to a modification logic 34.

Logic 34, which outputs to the time slot counters an attenuate signal on line 36, operates to prevent overflow of the time slot counters and therefore loss of information, and in a preferred embodiment described below, to provide better continuity between data sort samples. This logic maintains the time slot counters at a reasonable level relative to their capacity. For example, logic 34 typically operates to proportionately reduce, e.g. by some constant value, each time slot counter should the value of any one counter exceed a predefined threshold. Modification logic 34 includes appropriate comparative circuitry to accomplish this function.

As noted, the relative values of the time slot counters are also provided on lines 33 to clock selection logic 38 (which is broadly used herein to include any circuit components, such as registers, necessary to accomplish the functions described below). Clock selection logic 38 has two primary functions. First, the circuit confirms that the histogram stored in time slot counters 32 meets certain predefined specification requirements for selection of a retiming clock and, second, the circuit decides on an appropriate retiming clock phase from the plurality of available local DPLL signals of different phase. (As an alternate implementation, clock selection logic 38 can be replaced by a processor, and counters 32 by a set of registers readable by the processor. This alternate embodiment is preferred for low frequency operation, e.g. less than 20 MHz., but for higher frequency operation the clock selection logic is preferred.)

Logic 38 outputs on lines 41 a clock address indication K bits in length which comprises an identification of a selected retiming clock signal. This address identifier is sent to a clock select register 40 where the signal is latched on lines 21 to a multiplexer 16, which multiplexes the address with 1 through K local clocks of the same frequency but different phase produced by generator 14, for example, through a delay line 50 supplied by local clock 48. The output of multiplexer 16 is connected to the clock input "C" of D-latch 18 (FIG. 1) via line 25.

Clock selection logic 38 also outputs to a reset line 42 coupled to register 40 for resetting the register, for example, should the input signal become lost. By resetting register 40 the output data stream is necessarily interrupted since no retiming clock can subsequently be selected through multiplexer 16. The store signal on line 43, which is also coupled to register 40, directs the register to begin latching information from logic 38, thereby simultaneously result in outputting of the retiming clock.

Figure 3:
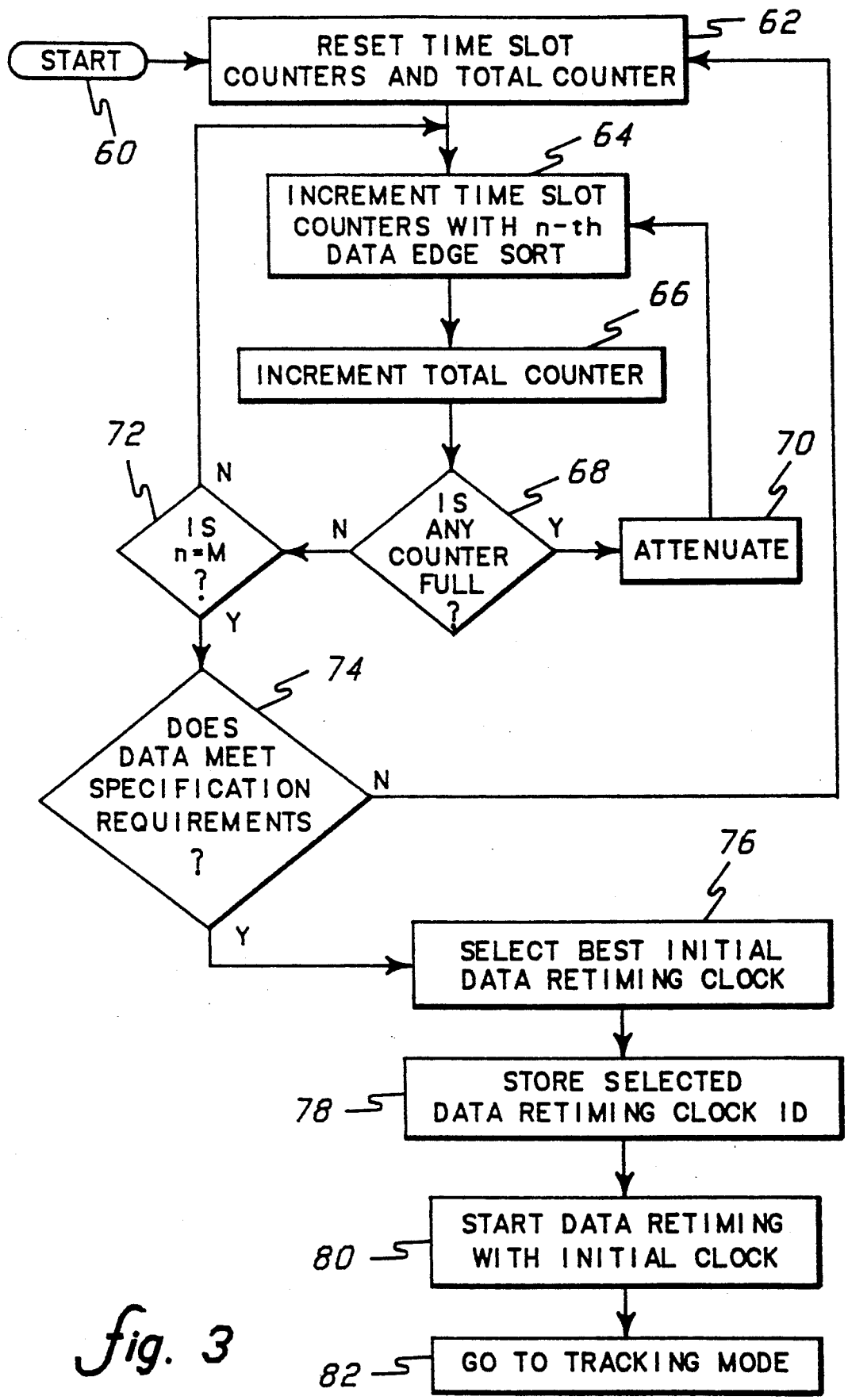
FIG. 3 is a functional flowchart of a first operational mode of the present invention (referred to herein as acquiring mode)
Figure 4:
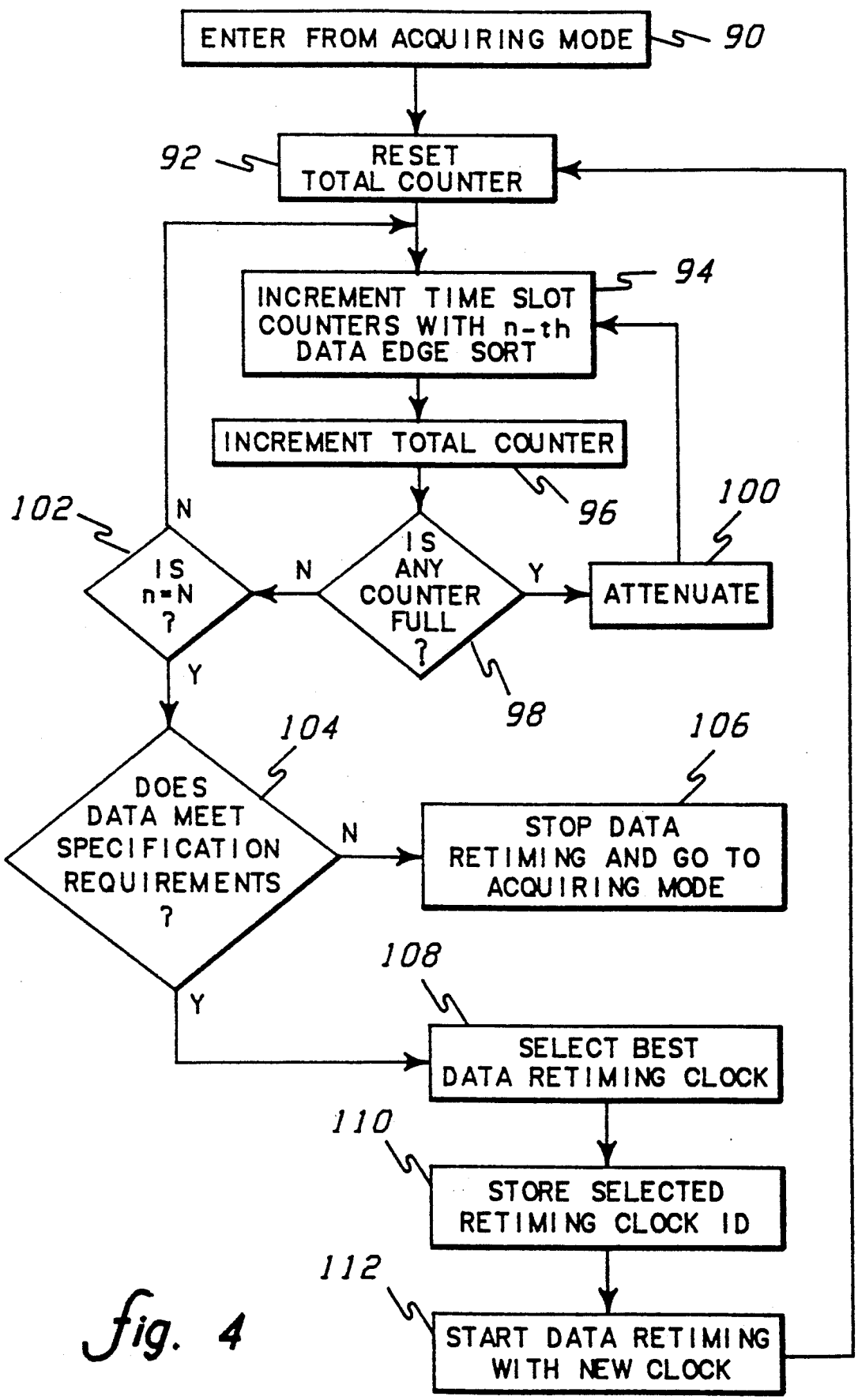
FIG. 4 is a functional flowchart of a second operational mode of the present invention (referred to herein as tracking mode).

A preferred processing technique for clock selection logic 38 (or a processor substituted therefor) utilizes two fundamental modes: an acquiring mode (FIG. 3) and a tracking mode (FIG. 4). Each of these modes will now be described.

Referring first to the acquiring mode, processing is begun, 60 "Start," by clearing the S time slot counters and the total counter, 62 "Reset Time Slot Counters and Total Counter." Thereafter, the time slot counters are incremented with each sorted data edge transition, 64 "Increment Time Slot Counters With n-th Data Edge Sort," along with the total counter, 66 "Increment Total Counter." After a sorted transition is stored in the appropriate counter, inquiry is made as to whether any counter has reached a predefined upper limit, 68 "Is Any Counter Full?" If "yes", all counters are attenuated, e.g., by a predefined constant, so as to maintain the same ratios therebetween. Thereafter, processing is continued and the next sorted data edge is stored in the appropriate time slot counter.

If inquiry 68 is "no", then clock selection logic 38 determines whether the n-th sorted edge being stored is the last transition in a predefined sample size, M, 72 "Is n=M?" Sample size M is prechosen to cover some interval of time sufficient to ensure that enough history exists to make a clock selection decision. Sample size is known by reference to the total counter. Assuming that a sample size M has not yet been reached, the circuit loops back to instruction 64 and increments the appropriate time slot counter with the next available sorted data edge transition. Once predefined sample size M is attained, inquiry is made as whether the integrated distribution of data edge transitions in the time slot counters meets predefined specification requirements, 74 "Does Data Meet Specification Requirements?" If "no", the time slot and total counters are reset and a new data edge transition histogram of sample size M is begun.

The predefined specification requirements are needed to insure that the compiled data edge transition history is truly indicative of a coherent data stream. As an example, specification requirements might be that (1) at least one counter has a count greater than 10 data edge sorts; and (2) at least one counter has a count less than or equal to one data edge sort. The specification requirements are selected to ensure that there exists some significant ratio between the time slot counts, i.e., that a relative minimum or a null in the time slot counts is identifiable. As already noted, a principal object hereof is to select a retiming signal which coincides with a minimum number of accumulated data edge transitions and, thus, to select a signal which least interferes with future data edge transitions.

Figure 2:
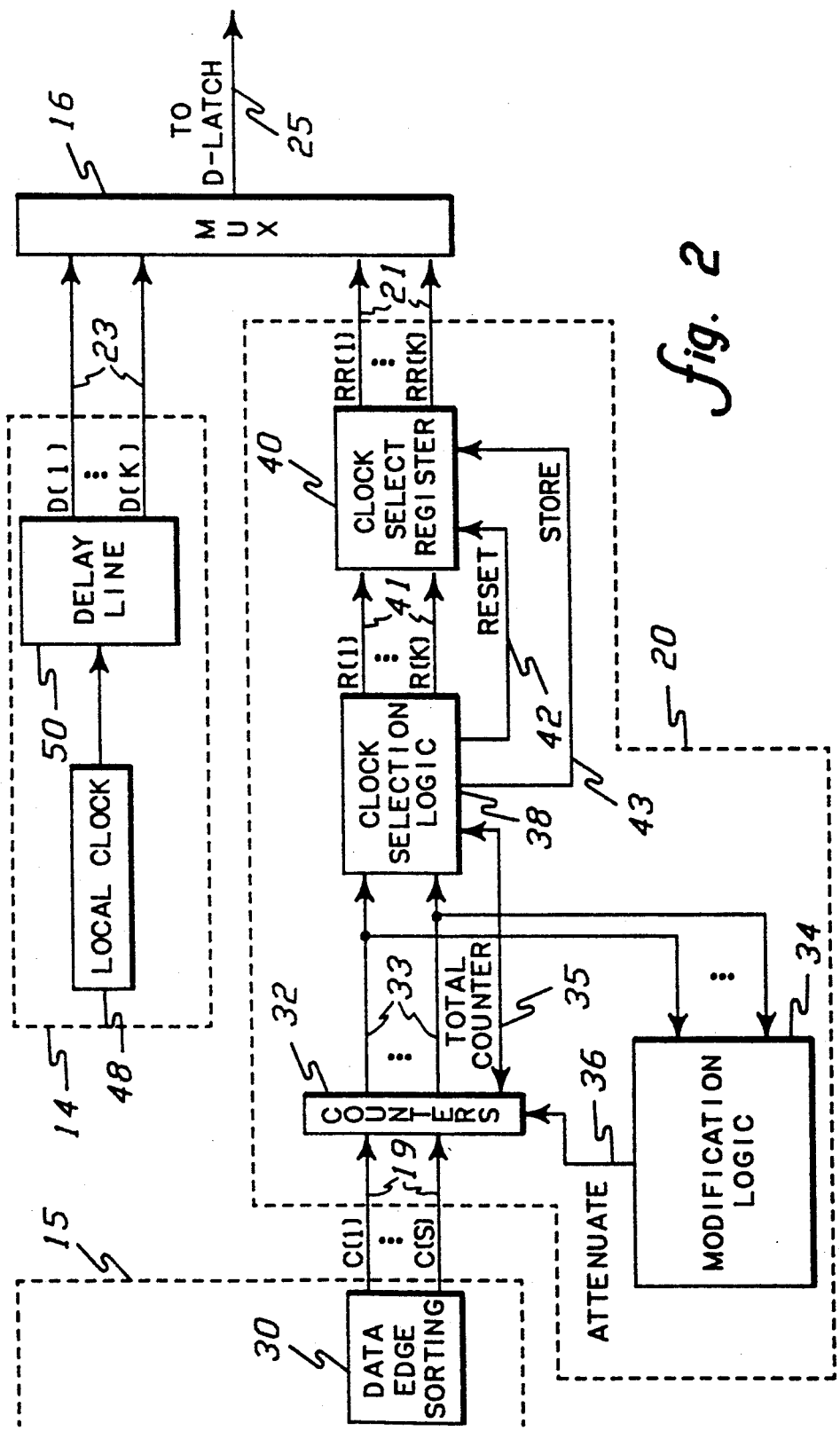
FIG. 2 is a block diagram representation of one embodiment of the clock selection circuitry of FIG. 1.

Assuming that the distribution meets requirements, an initial data retiming clock phase is selected, 76 "Select Best Initial Data Retiming Clock." The clock is selected from the plurality of local DPLL clocks of different phase generated, for example, by delay line 50 (FIG. 2). Various mathematical techniques exist for dealing with a grouped sample statistic which can be used to identify the best retiming clock phase. For example, see W. Cramer, *Mathematical Methods of Statistics,* published by the University of Stockholm, 1946, and references cited therein. Again the object is to select a time slot where a relative minimum number of the M integrated data edge transitions have occurred. In this regard, at least one time slot counter should be below a predefined lower threshold count level to ensure that the selected retiming clock will not interfere with future data transitions of the received signal. One technique for selecting a clock signal is to split the difference between the two closest time slot counters with counts above a preselected upper threshold. Alternatively, if only one time slot counter is above the upper threshold, then one-half a local clock cycle could be added to the one counter to identify a preferred retiming clock phase. In practice, the resultant histogram should also be evaluated to detect any unexpected count build ups of the time slot counter values.

An address identifying the selected retiming clock is next stored in the clock select register 40, 78 "Store Selected Data Retiming Clock I.D.," and data retiming is begun with the selected clock, 80 "Start Data Retiming With Initial Clock," after which, the system proceeds to the second mode, or normal mode, 82 "Go To Tracking Mode."

Referring to FIG. 4, after entering tracking mode, 90 "Enter From Acquiring Mode," the total counter is reset, 92 "Reset Total Counter." As with the acquiring mode, the tracking mode requires that the time slot counters be incremented with each sorted data edge transition, 94 "Increment Time Slot Counters With n-th Data Edge Sort," along with the total counter, 96 "Increment Total Counter." After incrementing the counters, inquiry is made as to whether any counter has reached the predefined threshold value, 98 "Is Any Counter Full?" and if "yes", the counters are attenuated as described above, 100 "Attenuate." Assuming that the time slot counters do not require attenuation, inquiry is made as to whether the n-th data edge sorted is the last in a desired sample size N, 102 "Is n=N?" Again, this is accomplished with reference to the total counter. Data edge transitions continue to be sorted into the counters until the sample size reaches N, whereupon the stored histogram is re-examined to re-select select an appropriate retiming clock signal.

In one implementation, sample size N used in the tracking mode may be smaller than sample size M of the acquiring mode. In the acquiring mode, M must be sufficiently large so that the distribution of data edge transitions provides a sufficient sampling basis to select an initial retiming clock. In the tracking mode, however, the sample size N is selected based upon the maximum frequency difference between the local DPLL clock and the input stream clock. (Preferably, the N tracking mode data sorts are added to the M acquiring mode sorts, rather than beginning a new history with each new sample interval.) A large frequency difference between the DPLL clock and the input clock implies a constantly changing phase and therefore a constantly changing retiming clock signal is needed. Again, except for the sample size, the operation is substantially the same as in the acquiring mode. In an alternate embodiment, one suitable for a high jitter environment, sample size M of the acquiring mode is defined to be relatively small to allow quick locking to an acceptable clock phase and sample size N of the tracking mode is defined to be relatively large (assuming that the local clock frequency is close to the data signal frequency) to desensitize the clock selection operations from input jitter.

If at any time the integrity of the received data stream is in question based upon an analysis of the distribution of integrated transitions in the time slot counters, 104, "Does Data Meet Specification Requirements?", the retimed data is inhibited and a new attempt at acquisition is initiated, 106 "Stop Data Retiming and Go To Acquiring Mode." If the sample distribution is acceptable, the best data retiming clock is again selected, 108 "Select Best Data Retiming Clock," stored, 110 "Store Selected Retiming Clock I.D.," and data retiming is begun using the new clock, 112 "Start Data Retiming With New Clock." In tracking mode, the entire process is repeated for each set of N data edge transitions. As noted, the time slot counters may be reset at the beginning of each group of N sorts or remain as compiled to provide continuity between groups.

It will be observed from the above description that the present invention contains the features initially set forth herein. In particular, the described method and apparatus each require a histogram of a prechosen number of data edge transitions for analysis and comparison thereof with a plurality of generated local clocks of different phase. A retiming signal is selected to coincide with a relative minimum number of past transitions, thereby optimizing retiming of received data. The histogram is re-examined after every N data edge sorts and a new retiming signal is chosen based thereon. The technique allows accurate data retiming even for a highly jittered and/or noisy data stream and is suitable for high speed applications. Further, the method and apparatus can be realized in hardware or in hardware/software combinations.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of invention. The following claims are intended to encompass all such modifications.

What is claimed is:

1. A method for selecting a retiming signal for a serial data stream from a plurality of local clock signals of different phase, said method comprising the steps of:
   (a) sorting in time a predefined number M of data edge transitions of the serial stream such that M time sorted data edge transitions are collected; and
   (b) using said time sorted M data edge transitions to select a retiming signal from the plurality of local clock signals such that said retiming signal occurs in time near a minimum number of said sorted data edge transitions of predefined number M.

2. The retiming signal selection method of claim 1, further comprising the steps of:
   (c) sorting in time a predefined number N or additional data edge transitions of the serial stream such that N time sorted additional data edge transactions are collected; and
   (d) using said time sorted additional N data edge transitions to select a new retiming signal from the plurality of local clock signals, said new retiming signal occurring in time near a minimum number of said additional sorted data edge transitions of predefined number N.

3. The retiming signal selection method of claim 2, further comprising the step of integrating said N and M sorted data edge transitions such that an integrated collection of M and N sorted data edge transitions is established, and wherein said step (d) comprises using said integrated sorted data edge transitions of predefined numbers N and M to select the new retiming signal from the plurality of local clock signals such that the retiming signal occurs in time near a minimum number of said integrated M and N data edge transactions.

4. The retiming signal selection method of claim 3, further comprising the step of repeating steps (c) & (d) for a plurality of data edge transition sets, and wherein said integrated step is accomplished with all of said sorted data edge transitions.

5. The retiming signal selection method of claim 4, further comprising the steps of:
   comparing, before each selection of a retiming signal in said step (d), the integrated data edge transition distribution with predefined criteria representative of an acceptable data edge transition distribution; and
   deleting said sorted data edge transitions and returning to said sorting step (a) should said integrated distribution fail to meet said criteria.

6. The retiming signal selection method of claim 1, further in combination with the step of retiming received data, said combination method including the steps of inputting said selected retiming signal to a first input of an edge triggered data latch, and inputting said serial data stream to a second input of said latch, whereby retimed data is available at an output of said latch.

7. A method for extracting a retiming signal from a serial data stream, said method comprising the steps of:
   (a) determining the approximate location in time of a data edge transition of the serial stream relative to a local clock;
   (b) storing an indication of said data edge transition location relative to said local clock;
   (c) repeating said steps (a) & (b) for a predefined number M of data edge transitions of the serial stream;

(d) establishing a plurality of local clock signals of the same frequency but different phase; and (e) selecting an acceptable retiming signal from said plurality of local clock signals of different phase by comparison thereof with the distribution formed by said M stored data edge transition location, said selected retiming signal coinciding with a relative minimum number of said data edge transitions of predefined number M.

8. The retiming signal extraction method of claim 7, wherein said selecting step (e) includes selecting said retiming signal from said plurality of local clock signals such that said retiming signal occurs in time near a null in the distribution formed by said M data edge transition location.

9. The retiming signal extraction method of claim 7, further comprising the steps of:

dividing said local clock into S consecutive time intervals, the sum of said time intervals having a period greater than the input period of said serial stream; and said determining step (a) including sorting said data edge transition into one of said S time intervals.

10. The retiming signal extraction method of claim 9, wherein said selecting step (e) includes selecting said retiming signal from said plurality of local clock signals such that said retiming signal occurs at a time interval approximately one-half cycle from a time interval having a data edge transition count exceeding a first predefined threshold.

11. The retiming signal extraction method of claim 9, wherein said selecting step (e) includes selecting said retiming signal from said plurality of local clock signals such that said retiming signal occurs at a time interval approximately in the midday of two time intervals having a data edge transition count exceeding a first predefined threshold.

12. A method of extracting a retiming signal from a serial data stream, said method comprising the steps of:

(a) determining the approximate location in time of a data edge transition of the serial stream relative to a local clock;

(b) storing an indication of said data edge transition location relative to said local clock;

(c) repeating said steps (a) & (b) for a predefined transitions of the serial stream;

(d) establishing a plurality of local clock signals of the same frequency but different phase;

(e) selecting an acceptable retiming signal from said plurality of local clock signals of different phase by comparison thereof with the distribution formed by said M stored data edge transitions, said selected retiming signal coinciding with a relative minimum number of said M data edge transitions: p1 (f) repeating steps (a) & (b) for N additional data edge transitions of the serial stream; and (g) selecting a new retiming signal from the plurality of local clock signals of different phase by comparison thereof with said N additional indications of data edge transitions.

13. The retiming signal extraction method of claim 12, further comprising the step of repeating step (f) & (g) for n sets of N additional data edge transitions.

14. The retiming signal extraction method of claim 13, wherein said selecting step (e) includes selecting said retiming signal from the plurality of local clock signals of different phase by comparison thereof with the distribution formed by said M and N accumulated data edge transitions.

15. An apparatus for generating a retiming signal for a serial data stream, said apparatus comprising:

(a) a data edge sorting circuit having an input coupled to receive the serial data stream, said sorting circuit for locating in time each of a plurality of data edge transitions of the serial stream;

(b) means for integrating a predefined number of sorted data edge transitions;

(c) means for generating a plurality of local clock signals of different phase; and (d) comparison means for identifying an acceptable retiming clock phase from said plurality of local clock signals by comparison thereof with said integrated data edge transitions, said acceptable retiming close phase coinciding with the relative minimum number of said sorted data edge transitions.

16. The generating apparatus of claim 15, wherein said integrating means (b) includes a plurality of time slot counters, each data transition sort being assigned to one of said time slot counters.

17. The generating apparatus of claim 16, wherein said comparison means (d) comprises clock selection logic.

18. The generating apparatus of claim 17, wherein relative time slot counter values are output to said clock selection logic for identification of a compatible retiming clock phase after said plurality of data edge transitions are sorted.

19. The generating apparatus of claim 18, further comprising:

a total counter for tracking the number of data edge transition sorts; and means for signaling said clock selection logic upon completion of a predefined number of data edge transition sorts.

20. The generating apparatus of claim 19, further comprising:

a clock select register coupled to the output of said clock selection logic, said register for holding an identification of the selected retiming clock signal;

said clock selection logic including means for comparing said integrated distribution of said time slot counters with predefined specification requirements comprising threshold values of a proper grouped transition distribution; and means for clearing the clock select register should the integrated distribution of said time slot counters fail to meet said predefined specification requirements.

21. The generating apparatus of claim 19, further comprising means for attenuating said time slot counters upon any one of said time slot counters reaching a predefined upper limit.

22. The generating apparatus of claim 17, further in combination with means for extracting data from the serial stream comprising:

a data latch having two inputs, a first input of said latch being coupled to receive said serial data stream; and means for feeding the selected retiming clock signal to the second input of said data latch, whereby the output of said data latch comprises the retimed data.

* * * * *

UNITED STATES PATENT AND TRADEMARK OFFICE
CERTIFICATE OF CORRECTION

PATENT NO. : 5,185,768

DATED : Feb. 9, 1993

INVENTOR(S) : Ferraiolo et al.

It is certified that error appears in the above-identified patent and that said Letters Patent is hereby corrected as shown below:

Column 8, line 15, delete "or" and substitute therefor --of--.

Column 8, line 17, delete "transactions" and substitute therefor --transitions--.

Column 8, line 35, delete "transactions" and substitute therefor --transitions--.

Column 9, line 35, delete "midday" and substitute therefor --middle--.

Column 9, lines 45-46, delete "a predefined" and substitute therefor --M data edge--.

Column 9, line 54 delete "P1".

Column 10, line 18, delete "close " and substitute therefor --clock--.

Signed and Sealed this

Ninth Day of November, 1993

Attest:

BRUCE LEHMAN

Attesting Officer

Commissioner of Patents and Trademarks